(12) United States Patent
Esch et al.

(10) Patent No.: US 11,750,095 B2
(45) Date of Patent: Sep. 5, 2023

(54) VOLTAGE CONVERTER

(71) Applicant: STMicroelectronics (Grenoble 2) SAS, Grenoble (FR)

(72) Inventors: Helene Esch, Seyssinet Pariset (FR); Mathilde Sie, Bernin (FR); David Chesneau, Grenoble (FR); Eric Feltrin, Grenoble (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 266 days.

(21) Appl. No.: 17/078,284

(22) Filed: Oct. 23, 2020

(65) Prior Publication Data

US 2021/0126535 A1 Apr. 29, 2021

(30) Foreign Application Priority Data

Oct. 24, 2019 (FR) ...................................... 1911933

(51) Int. Cl.
*H02M 3/158* (2006.01)
*H02M 1/08* (2006.01)
*H02M 1/00* (2006.01)
*H02M 3/156* (2006.01)

(52) U.S. Cl.
CPC ............. *H02M 3/158* (2013.01); *H02M 1/08* (2013.01); *H02M 1/0022* (2021.05); *H02M 3/156* (2013.01)

(58) Field of Classification Search
None
See application file for complete search history.

(56) References Cited

U.S. PATENT DOCUMENTS

| 5,652,772 A | 7/1997 | Isaksson et al. |
| 5,732,113 A | 3/1998 | Schmidl et al. |
| 5,987,063 A | 11/1999 | Rinne |
| 6,295,217 B1 | 9/2001 | Yang et al. |
| 6,295,326 B1 | 9/2001 | Tonissen et al. |
| 6,320,915 B1 | 11/2001 | Stott et al. |
| 6,359,938 B1 | 3/2002 | Keevill et al. |
| 6,363,128 B1 | 3/2002 | Isaksson et al. |
| 6,658,063 B1 | 12/2003 | Mizoguchi et al. |
| 6,731,594 B1 | 5/2004 | Bohnke |
| 7,039,000 B2 | 5/2006 | You et al. |
| 7,586,294 B2 | 9/2009 | Endo |
| 7,863,875 B1 | 1/2011 | Guo et al. |
| 7,872,456 B2 | 1/2011 | Li et al. |
| 8,199,537 B2 | 6/2012 | Yan et al. |

(Continued)

FOREIGN PATENT DOCUMENTS

| EP | 2819288 A1 | 12/2014 |
| EP | 3468022 A1 | 4/2019 |

(Continued)

*Primary Examiner* — Matthew V Nguyen
(74) *Attorney, Agent, or Firm* — Slater Matsil, LLP

(57) ABSTRACT

In an embodiment, a voltage converter includes: a first transistor coupled between a first rail configured to receive a supply voltage and a first node; and an inductance coupled between the first node and a second node configured to deliver an output voltage, wherein, at each operating cycle of the converter, the first transistor is maintained in the on state for a first time period proportional to the inverse of a voltage difference between the supply voltage and the output voltage.

22 Claims, 4 Drawing Sheets

(56) References Cited

U.S. PATENT DOCUMENTS

| | | | |
|---|---|---|---|
| 8,552,706 B2 * | 10/2013 | Wu | H02M 3/1588 323/284 |
| 9,077,242 B2 | 7/2015 | Causse et al. | |
| 9,112,425 B2 | 8/2015 | Prescott et al. | |
| 9,325,233 B2 | 4/2016 | Bennett et al. | |
| 9,467,051 B2 | 10/2016 | Stoichita et al. | |
| 9,577,527 B2 | 2/2017 | Trichy et al. | |
| 9,621,036 B2 | 4/2017 | Wibben | |
| 9,722,490 B2 | 8/2017 | Archibald | |
| 9,991,798 B2 | 6/2018 | Lu | |
| 10,944,324 B2 | 3/2021 | Chesneau | |
| 2002/0057082 A1 | 5/2002 | Hwang | |
| 2002/0159533 A1 | 10/2002 | Crawford | |
| 2002/0181509 A1 | 12/2002 | Mody et al. | |
| 2003/0123582 A1 | 7/2003 | Kim et al. | |
| 2004/0001563 A1 | 1/2004 | Scarpa | |
| 2004/0005018 A1 | 1/2004 | Zhu et al. | |
| 2004/0190438 A1 | 9/2004 | Maltsev et al. | |
| 2005/0018458 A1 | 1/2005 | Shimada et al. | |
| 2006/0001410 A1 | 1/2006 | Ishikawa et al. | |
| 2006/0113980 A1 | 6/2006 | Yoshida | |
| 2006/0192536 A1 | 8/2006 | Chen et al. | |
| 2007/0024261 A1 | 2/2007 | Wong et al. | |
| 2007/0057658 A1 | 3/2007 | Hasegawa et al. | |
| 2007/0069703 A1 | 3/2007 | Kokubun et al. | |
| 2007/0090819 A1 | 4/2007 | Hasegawa | |
| 2008/0298106 A1 | 12/2008 | Tateishi | |
| 2008/0315851 A1 | 12/2008 | Akiyama et al. | |
| 2009/0079405 A1 | 3/2009 | Brokaw et al. | |
| 2009/0160412 A1 | 6/2009 | Latham et al. | |
| 2010/0033153 A1 | 2/2010 | Xing et al. | |
| 2010/0072964 A1 | 3/2010 | Qiu et al. | |
| 2010/0320991 A1 | 12/2010 | Yoshino | |
| 2010/0327836 A1 | 12/2010 | Li et al. | |
| 2011/0031948 A1 | 2/2011 | Chien et al. | |
| 2011/0316495 A1 | 12/2011 | De Nie | |
| 2012/0038331 A1 | 2/2012 | Wu et al. | |
| 2012/0049826 A1 | 3/2012 | Hsu et al. | |
| 2012/0161738 A1 | 6/2012 | Nakashima | |
| 2013/0106385 A1 | 5/2013 | Smith, Jr. et al. | |
| 2013/0207563 A1 | 8/2013 | Hamamoto et al. | |
| 2014/0191744 A1 | 7/2014 | Choi et al. | |
| 2015/0077080 A1 | 3/2015 | Chen | |
| 2015/0214827 A1 * | 7/2015 | Yoon | H02M 1/14 323/286 |
| 2016/0233768 A1 | 8/2016 | de Cremoux et al. | |
| 2016/0306371 A1 | 10/2016 | Svorc et al. | |
| 2018/0062513 A1 | 3/2018 | Arbetter | |
| 2019/0267897 A1 | 8/2019 | Hsieh | |
| 2020/0136508 A1 * | 4/2020 | Bandyopadhyay | H03K 5/24 |
| 2021/0126535 A1 | 4/2021 | Esch et al. | |
| 2021/0184580 A1 | 6/2021 | Chesneau | |
| 2022/0263406 A1 * | 8/2022 | Ortet | H02M 3/158 |
| 2022/0345040 A1 * | 10/2022 | Couleur | H02M 1/0009 |

FOREIGN PATENT DOCUMENTS

| | | | |
|---|---|---|---|
| FR | 3102900 A1 * | 5/2021 | G01R 19/16519 |
| KR | 20100102824 A | 9/2010 | |

* cited by examiner

VOLTAGE CONVERTER

CROSS-REFERENCE TO RELATED APPLICATIONS

This application claims the benefit of French Patent Application No. 1911933, filed on Oct. 24, 2019, which application is hereby incorporated herein by reference.

TECHNICAL FIELD

The present disclosure relates generally to an electronic system and method, and, in particular embodiments, to a voltage converter.

BACKGROUND

In a switched-mode power converter, a DC voltage for powering the converter is chopped by switching switches to implement phases of power storage in an inductive element and phases of discharge, towards a load connected to the converter output, of the power stored in the inductive element.

In a pulse frequency modulation (PFM) type switched-mode converter, each operating cycle of the converter comprises a phase of power storage in the inductive element, followed by a phase of power delivery to the load connected to the converter. During the power storage phase (charge phase), the current flowing through the inductive element increases. During the power delivery phase (discharge phase), the current flowing through the inductive element decreases. For each operating cycle, the current flowing through the inductive element is zero at the beginning of the power storage phase and at the end of the power delivery phase.

Known PFM-type switched-mode converters have various disadvantages.

SUMMARY

Some embodiments relate to DC/DC voltage converters, of switched-mode power supply type, which convert a DC power supply voltage into a DC output voltage. Some embodiments particularly relate to buck-type DC/DC voltage converters where the DC output voltage has a lower value than the DC power supply voltage.

Some embodiments relate to switched-mode converters of PFM type.

An embodiment overcomes all or part of the disadvantages of known switched-mode converters, particularly of PFM type.

An embodiment provides a voltage converter comprising:
a first MOS transistor connected between a first rail configured to receive a power supply potential and a first node; and
an inductance connected between the first node and a second node configured to deliver an output potential, wherein, at each operating cycle of the converter, the first MOS transistor is maintained in the on state for a first time period proportional to the inverse of a potential difference between the power supply potential and the output potential.

According to an embodiment, the converter further comprises a second MOS transistor connected between the first node and a second rail configured to receive a reference potential.

According to an embodiment, the converter further comprises a control circuit configured to control, at each operating cycle, successively:
a setting to the on state of the first transistor;
a setting to the off state of the first transistor and a setting to the on state of the second transistor; and
a setting to the off state of the second transistor,
the control circuit being configured, at each operating cycle, to maintain the first transistor in the on state for the first time period.

According to an embodiment, the control circuit is further configured to start an operating cycle when the output potential is lower than a potential set point.

According to an embodiment, the control circuit further comprises a ramp generator configured to deliver a potential ramp with a slope proportional to the potential difference, the first time period being determined from a comparison of the potential ramp with the output potential or the potential set point.

According to an embodiment, the potential ramp increases from the reference potential, the first time period corresponding to the time taken by the potential ramp to increase from the reference potential to the output potential or to the potential set point.

According to an embodiment, the control circuit further comprises a comparator configured to compare the potential ramp with the output potential or the potential set point.

According to an embodiment, the ramp generator comprises:
a capacitor connected between the second rail and a third node configured to deliver the potential ramp; and
a current source having a first terminal connected to the first rail and having a second terminal connected to the third node, the current source being configured to deliver a current having a value proportional to the potential difference.

According to an embodiment, the current source comprises:
a third MOS transistor connected between the second rail and a fourth node;
a resistor connected between the first rail and the fourth node;
a fourth MOS transistor connected between the second rail and a fifth node;
a fifth MOS transistor connected between the first rail and the fifth node;
a sixth MOS transistor mirror-assembled with the fifth transistor and connected between the first rail and the second terminal of the current source; and
an operational amplifier having a first input, preferably inverting, configured to receive the output potential, having a second input, preferably non-inverting, connected to the fourth node, and having an output connected to a control terminal of the third transistor and to a control terminal of the fourth transistor.

According to an embodiment, the ramp generator further comprises a switch connected in parallel with the capacitor.

According to an embodiment, the control circuit is further configured to control the turning off of the switch at each beginning of an operating cycle of the converter.

According to an embodiment, the control circuit is configured, at each operating cycle of the converter, to maintain the second MOS transistor in the on state for a second time period.

According to an embodiment, the control circuit is configured, at each operating cycle of the converter, to maintain the second MOS transistor in the on state for a second time period, the control circuit further comprising another ramp generator configured to deliver another potential ramp with a slope proportional to the potential difference, the second time period being determined from a comparison of the other potential ramp with the output potential or the potential set point.

According to an embodiment, the other potential ramp decreases from the power supply potential, the second time period corresponding to the time taken by the other potential ramp to decrease from the power supply potential to the output potential or to the potential set point.

According to an embodiment, the control circuit comprises a state machine.

BRIEF DESCRIPTION OF THE DRAWINGS

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
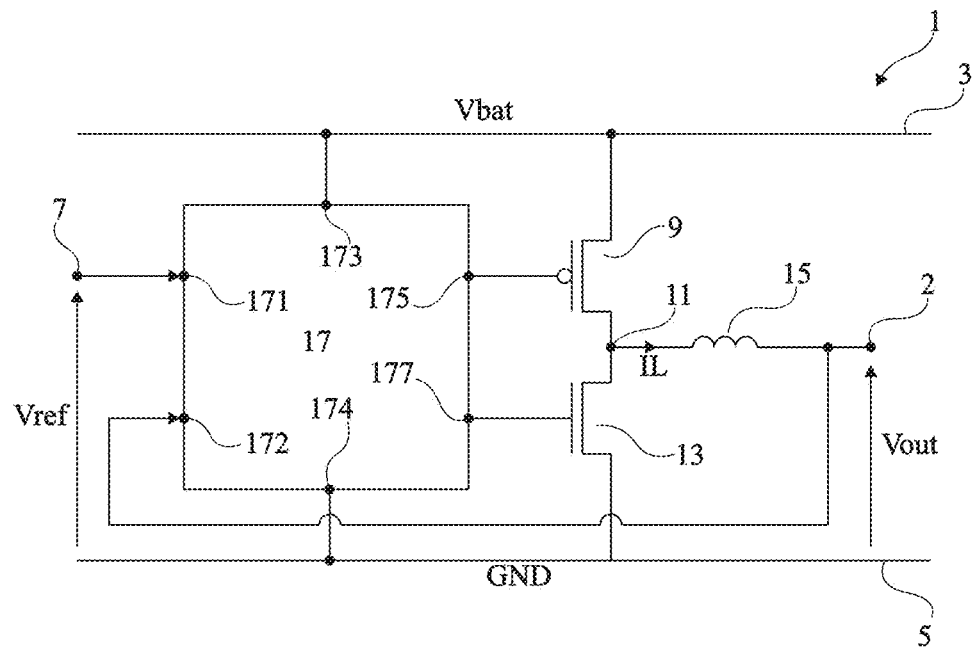
FIG. 1 very schematically shows an embodiment of a DC/DC voltage converter.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the usual applications where a DC/DC converter may be provided have not been detailed, the described embodiment being compatible with such usual applications.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more other elements.

In the following description, when reference is made to terms qualifying absolute positions, such as terms "front," "back," "top," "bottom," "left," "right," etc., or relative positions, such as terms "above," "under," "upper," "lower," etc., or to terms qualifying directions, such as terms "horizontal," "vertical," etc., unless otherwise specified, it is referred to the orientation of the drawings.

The terms "about," "approximately," "substantially," and "in the order of," are used herein to designate a tolerance of plus or minus 10%, preferably of plus or minus 5%, of the value in question.

FIG. 1 very schematically shows an embodiment of a DC/DC voltage converter 1.

Converter 1 is configured to deliver a DC output potential Vout referenced to a reference potential, typically ground GND. The converter comprises an output node 2, on which potential Vout is available.

Converter 1 is powered with a DC power supply potential Vbat referenced to reference potential GND. Converter 1 is then connected between a first conductive rail or node 3 set to potential Vbat and a second conductive rail or node 5 set to reference potential GND.

Converter 1 is configured to deliver potential Vout at a value equal to a set point value. For this purpose, converter 1 receives, on an input node 7, a DC potential set point Vref referenced to potential GND, having a value representative of the set point value of potential Vout, preferably equal to the set point value of potential Vout.

In this example, potentials Vout, Vbat, and Vref are positive.

In this example, converter 1 is of buck type, that is, the set point value of potential Vout is smaller than the value of potential Vbat. In other words, the value of potential Vout is smaller than that of potential Vbat.

Converter 1 comprises a first MOS ("metal oxide semiconductor") transistor 9, preferably a PMOS transistor (P-channel MOS transistor). MOS transistor 9 is connected between rail 3 and a (first) node 11. In other words, a first conduction terminal of transistor 9, for example, its source, is connected to rail 3, a second conduction terminal of transistor 9, for example, its drain, being connected to node 11.

Converter 1 further comprises a second MOS transistor 13, preferably an NMOS transistor (N-channel MOS transistor). Transistor 13 is connected between node 11 and rail 5. In other words, a first conduction terminal of transistor 13, for example, its source, is connected to rail 5, a second conduction terminal of transistor 9, for example, its drain, being connected to node 11.

Thus, transistors 9 and 13 are series-connected between rails 3 and 5 and are connected to each other at the level of inner node 11.

Converter 1 comprises an inductive element or inductance 15. Inductance 15 is connected between node 11 and (second) node 2.

Converter 1 comprises a control circuit 17. Circuit 17 is configured to implement or control the operating cycles of converter 1, to regulate potential Vout so that its value is equal to set point value Vref.

For this purpose, circuit 17 comprises:
a terminal 171 coupled, preferably connected, to node 7;
a terminal 172 coupled, preferably connected, to node 2;
a terminal 173 coupled, preferably connected, to rail 3;
a terminal 174 coupled, preferably connected, to rail 5;
a terminal 175 coupled, preferably connected, to a control terminal, or gate, of transistor 9; and
a terminal 177 coupled, preferably connected, to a control terminal, or gate, of transistor 13.

Converter 1 comprises an output capacitor (not shown) connected between node 2 and rail 5. As an example, this capacitance is in the order of from 2.2 µF to 20 µF, or even more. Such an output capacitor plays the role of a filter. In other words, the converter output capacitor enables to smooth the current present on node 2 and to store power supplied to node 2 by the converter.

Although this is not shown herein, in operation, a load is connected between node 2 and rail 5 to be powered with potential Vout. The load generally comprises an input capacitor between node 2 and rail 5.

According to an embodiment, converter 1 is configured to operate in pulse frequency modulation (discontinuous conduction mode). In this embodiment, circuit 17 is then configured to start an operating cycle of converter 1 when the value of potential Vout is smaller than set point value Vref and the two transistors 9 and 13 are in the off state. More particularly, at the beginning of each operating cycle, while the two transistors 9 and 13 are in the off state and no node current IL flows through inductance 15, circuit is configured to control the setting to the on state of transistor 9, transistor 11 being left in the off state. Power is then stored in inductance 15, during a first time period Ton when transistor 8 is maintained in the on state by circuit 17. At the end of time period Ton, circuit 17 is configured to control the setting to the off state of transistor 9 and the setting to the on state of transistor 13. Power is then delivered back by inductance 15 to the load connected at the converter output, for a second time period Toff when transistor 13 is maintained in the on state by circuit 17. At the end of time period Toff, circuit 17 is configured to control the setting to the off state of transistor 13. Time period Toff is determined so that the time when circuit 17 controls the setting to the off state of transistor 13 corresponds to the time when the current flowing through the inductance becomes zero.

Figure 2:
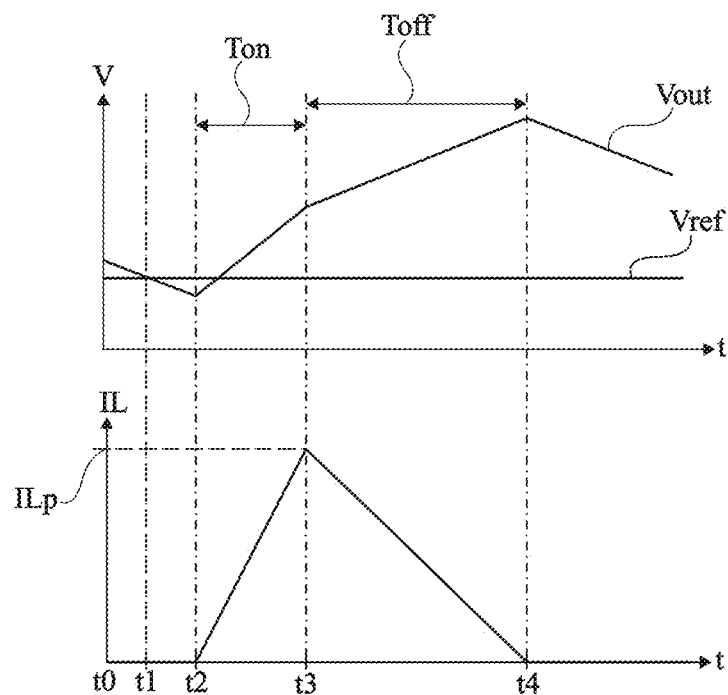
FIG. 2 shows timing diagrams illustrating the operation of the converter of FIG. 1.

FIG. 2 shows timing diagrams illustrating the operation of the converter 1 of FIG. 1, according to an embodiment where converter 1, for example, its control circuit 17, is configured to operate in pulse frequency modulation.

The timing diagram at the top of FIG. 2 illustrates the variation over time t of potential Vout, in volts V, the timing diagram at the bottom of FIG. 2 illustrating the corresponding variation, over time t, of the current IL flowing through inductance 15.

At a time t0, transistor 9 and 13 are in the off state, current IL is zero, and the value of potential Vout is greater than its set point value, in the present example, the value of potential Vref.

Between time t0 and a subsequent time t2, potential Vout decreases, for example due to the fact that the load connected to converter 1 consumes current.

At a time t1 between times t0 and t2, potential Vout becomes smaller than its set point value Vref. This is detected by the circuit 17 of converter 1, which then controls the setting to the on state of transistor 9. Transistor 9 turns on at time t2.

Thus, from time t2, inductance 15 has a terminal connected to node 2 and a terminal coupled to rail 3, via transistor 9. The current IL flowing through inductance 15 increases with a slope A1 defined by the following relation (1):

$$A1=(Vbat-Vout)/L,$$

L being the value of inductance 15.

As a result, from time t2, current IL is delivered to node 2 and the capacitor (not shown in FIG. 1) between node 2 and rail 5 charges. Potential Vout increases and becomes greater again than its set point value Vref.

At a next time t3, equal to t2+Ton, circuit 17 controls transistor 13 to the on state and transistor 9 to the off state.

Thus, from time t3, inductance 15 has a terminal connected to node 2 and a terminal coupled to rail 5, via transistor 11. The current IL flowing through inductance 15 decreases with a slope A2 defined by the following relation (2):

$$A2=-Vout/L.$$

Although current IL decreases from time t3, as long as it is not zero, the capacitor between node 2 and rail 5 keeps on charging and potential Vout keeps on increasing if the current drawn by the load is smaller than the current IL supplied to node 2.

At a next time t4, equal to t3+Toff, circuit 17 controls transistor 13 to the off state, current IL being zero at time t4.

From time t4, current IL is zero and potential Vout decreases, similarly to what would happen at time t0.

Although this is not shown herein, when the value of potential Vout falls back below its set point value at a time subsequent to time t4, circuit 17 implements a new operating cycle such as described in relation with the successive times t2, t3, and t4.

During an operating cycle of converter 1, the current IL through inductance 15 reaches a maximum value ILp at time t3, that is, at the end of time period Ton and at the beginning of time period Toff or, in other words, when circuit 17 controls the setting of transistor 9 to the off state and the setting of transistor 13 to the on state after having maintained transistor 9 in the on state for time period Ton. Value ILp is defined by the following relation (3):

$$ILp=((Vbat-Vout)*Ton)/L.$$

The electric power consumed by converter 1 depends on value ILp. Value ILp is preferably determined to minimize the electric power consumed by the converter, while enabling to regulate potential Vout to its set point value when the power consumed by the load connected to converter 1 does not exceed a given maximum value and the value of potential Vbat is greater than or equal to a given minimum value.

Further, converter 1 is provided to operate with different values of potential Vbat. For example, the value of potential Vbat is different between two different applications where converter 1 is provided, and is capable of varying in operation for a given application.

In some embodiments, to avoid for the electric power consumed by converter 1 to depend on the value of potential Vbat, the inventors here provide, e.g., in converter 1, for time period Ton to be proportional to the inverse of the potential difference between potential Vbat and potential Vout. In other words, converter 1 is configured so that the time period Ton verifies the following relation (4):

$$Ton=A3/(Vbat-Vout),$$

A3 being a positive proportionality coefficient, different from zero and independent from Vbat.

Thereby, the maximum value ILp of current IL crossing inductance 15 is independent from the value of potential Vbat, which in some embodiments is particularly advantageous.

Figure 3:
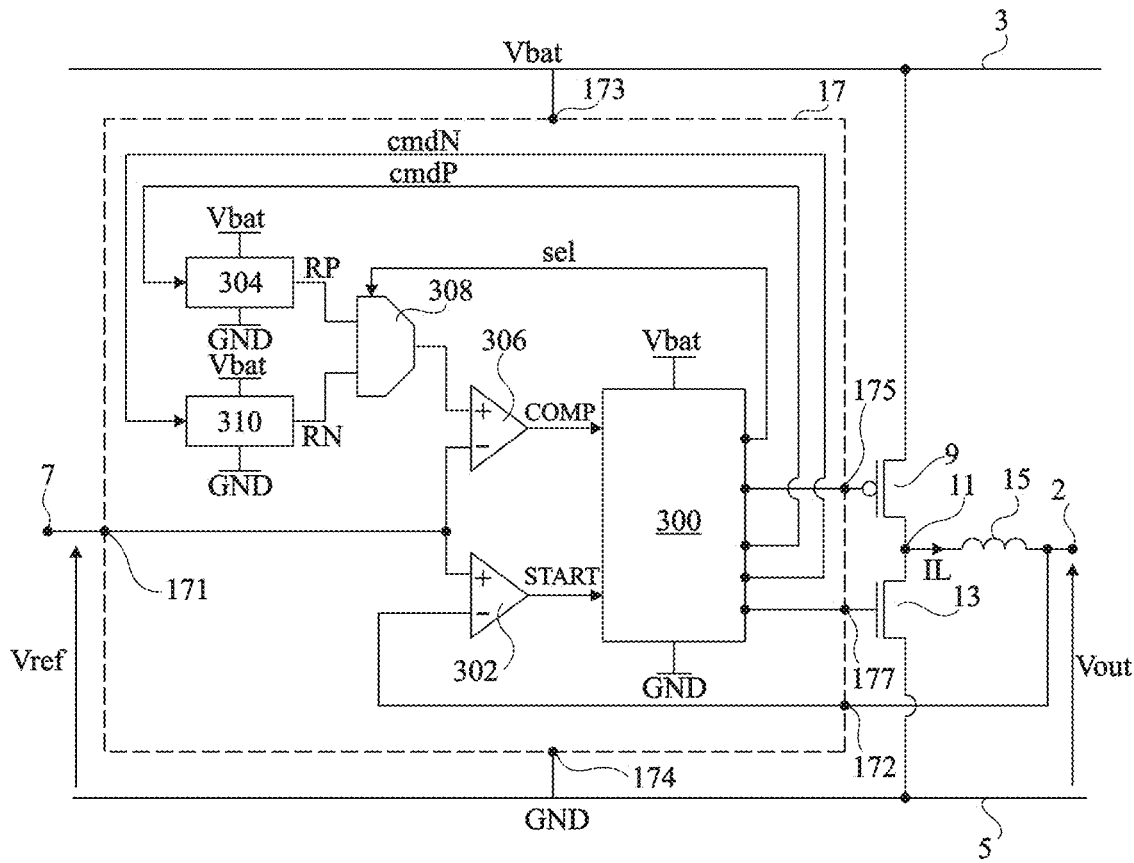
FIG. 3 shows a more detailed embodiment of the converter of FIG. 1.

FIG. 3 shows a more detailed embodiment of the converter 1 of FIG. 1. Only the details which are not illustrated in FIG. 1 are here highlighted, such details concerning the circuit 17 of converter 1, delimited by a frame in dotted lines in FIG. 3.

Circuit 17 comprises a state machine 300. State machine 300 is configured to deliver the control signals of transistors 9 and 13 to respective terminals 175 and 177 to implement the operation described in relation with FIGS. 1 and 2. To determine the control signals of transistors 9 and 13, state machine 300 receives a plurality of signals. In practice, state machine 300 is implemented in hardware fashion and corresponds to a circuit. Circuit 300 is powered with potential Vbat and is connected between rails 3 and 5, which connections are not detailed in FIG. 3 to avoid overloading the drawing.

Circuit 17 comprises a comparator 302 configured to deliver, on its output, a signal START representative of the comparison of the value of potential Vout with its set point value. The output of comparator 302 is connected to circuit 300. Signal START is in a first state, for example, a high state, when the value of potential Vout is smaller than its set point value and in a second state, for example, a low state, when the value of potential Vout is greater than its set point value. Comparator 302 comprises a first input, for example, inverting (−), configured to receive a potential having a value representative of the value of potential Vout and a second input, for example, non-inverting (+), configured to receive a potential having a value representative of the set point value of potential Vout.

In this example where the value of potential Vref is equal to the set point value of potential Vout, comparator 302 is configured to compare potential Vref with potential Vout, the first input of comparator 302 being connected to node 2 and the second input of comparator 302 being connected to terminal 171 of circuit 17.

In this embodiment, time period Ton is determined by comparing a potential ramp RP with potential Vref or with potential Vout, where the latter can be considered as being equal to potential Vref. Thus, circuit 17 comprises a ramp generator 304 configured to deliver potential ramp RP and a comparator 306 configured to compare ramp RP with potential Vref or Vout, in the present example with potential Vref. Potential RP is referenced to reference potential GND.

Generator 304 is powered with potential Vbat and is connected between rails 3 and 5, which connections are not shown in FIG. 3 to avoid overloading the drawing.

Generator 304 is controlled by circuit 300, via a signal cmdP. More particularly, when signal START is in its first state indicating that the value of potential Vout is smaller than its set point value, and if the two transistors 9 and 1 are in the on state, circuit 300 controls transistor 9 to the on state and, at the same time, and the starting, or beginning, of a potential ramp RP via signal cmdP. As an example, signal cmdP is determined from the control signal delivered by circuit 300 to transistor 9, or even is identical to the control signal delivered by circuit 300 to transistor 9.

Ramp generator 304 is configured so that the slope of each potential ramp RP is proportional to the difference between potentials Vbat and Vout.

According to an embodiment, each potential ramp RP is a ramp increasing from reference potential GND.

Ramp RP is transmitted to a first input, for example, non-inverting (+), of comparator 306, the second input, for example, inverting (−), of the comparator receiving potential Vref, and the output of comparator 306 delivering a signal COMP to circuit 300.

According to the embodiment illustrated in FIG. 3, potential ramp RP is transmitted to comparator 306 via a selection circuit 308 (e.g., a multiplexer) comprising two inputs, one output, and one control terminal. The control terminal of circuit 308 receives a signal sel from circuit 300. According to the state of signal sel, circuit 308 transmits on its output the signal present on one or the other of its inputs.

More particularly, at the time when circuit 300 controls the setting of transistor 9 to the on state and the beginning of a potential ramp RP, circuit 300 places signal sel in a first state such that comparator 306 receives potential ramp RP.

Thus, as long as signal sel is maintained in its first state, signal COMP is in a first state, for example, the low state, as long as potential RP is smaller than potential Vref, and switches to a second state, for example, the high state, as soon as potential RP becomes greater than potential Vref.

The switching of signal COMP from its first state to its second state marks the end of time period Ton. Circuit 300 then controls transistor 9 to the off state and transistor 11 to the on state. Preferably, circuit 300 simultaneously controls the end of potential ramp RP, via signal cmdP.

In this embodiment, time period Toff is determined by comparing a potential ramp RN with potential Vref or with potential Vout, and more particularly, in the present example, with potential Vref. Thus, circuit 17 comprises a ramp generator 310 configured to deliver potential ramp RN.

Generator 310 is powered with potential Vbat and is connected between rails 3 and 5, which connections are not shown in FIG. 3 to avoid overloading the drawing. Generator 310 is controlled by circuit 300, via a signal cmdN.

More particularly, at the end of time period Ton, when circuit 300 controls transistor 9 to the off state and transistor 13 to the on state, circuit 300 also controls the starting a potential ramp RN via signal cmdN. As an example, signal cmdN is determined from the control signal delivered by circuit 300 to transistor 13, or even is identical to the control signal delivered by circuit 300 to transistor 13.

According to an embodiment, each potential ramp RN is a ramp decreasing from power supply potential Vbat.

According to the embodiment illustrated in FIG. 3, the comparison of ramp RN with potential Vref is implemented by comparator 306. Ramp RN is then transmitted to the second input of circuit 308. Further, circuit 300 is configured to switch signal sel to its second state, at the same time as it controls the setting to the off state of transistor 9 and the setting to the on state of transistor 13, so that ramp RN is transmitted to comparator 306.

Thus, in embodiments where each ramp RN is decreasing from potential Vbat, as long as signal sel is maintained in its second state, signal COMP is in its second state, for example, the high state, as long as potential RN is greater than potential Vref, and switches to its first state, for example, the low state, as long as potential RN becomes smaller than potential Vref.

The switching of signal COMP from its second state to its first state marks the end of time period Toff. Circuit 300 then controls the setting to the off state of transistor 13. Preferably, circuit 300 simultaneously controls the end of potential ramp RN, via signal cmdN.

In the converter 1 described in relation with FIG. 3, due to the fact that the slope of potential ramp RP is proportional to the difference between potentials Vbat and Vout and that the potential ramp is equal to Vref at the end of time period Ton, time period Ton verifies the following relation (5):

$$Ton = (A4 * Vref)/(Vbat - Vout),$$

A4 being a proportionality coefficient, for example positive for an increasing ramp RP, and (Vbat−Vout)/A4 being the slope of ramp RP.

By injecting relation (5) into relation (3), the following relation (6) is obtained:

$$ILp = (A4 * Vref)/L.$$

Thus, in converter 1, the maximum value ILp of current IL is effectively independent from the value of potential Vbat.

In an alternative embodiment, not shown, the comparison of potential ramp RP with potential Vref is implemented by comparator 306, and the comparison of potential ramp RN with potential Vref is implemented by means of an additional comparator provided in circuit 17. The additional comparator then receives on a first input, for example, non-inverting (+), potential ramp RN, and on a second input, for example, inverting (−), potential Vref, the output of the additional comparator delivering, to circuit 300, a signal representative of the comparison of potential ramp RN with potential Vref. In this variation, circuit 308 is omitted and circuit 300 does not generate signal sel. It will be within the abilities of those skilled in the art to adapt the above description of converter 1 of FIG. 3 to this alternative embodiment.

Figure 4:
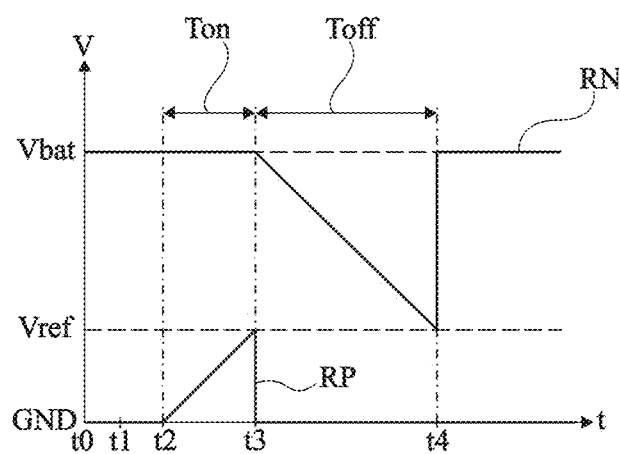
FIG. 4 shows timing diagrams illustrating the operation of the converter of FIG. 3, according to an embodiment.

FIG. 4 shows timing diagrams illustrating the operation of the converter 1 of FIG. 3 according to an implementation mode. More particularly, FIG. 4 shows the variation, over time t, of potential ramps RN and RP, in volts (V), during an operating cycle of the converter 1 of FIG. 3, the times t0, t1, t2, t3, and t4 shown in FIG. 4 being identical to those described in relation with FIG. 2.

In this embodiment, potential ramp RP increases from reference potential GND and is compared with potential Vref to determine time period Ton, ramp RP decreasing from power supply potential Vbat and being compared with potential Vref to determine time period Toff.

At time t0, potential RP is equal to potential GND, potential RN is equal to potential Vbat, and signal COMP is in its first state. Further, signal START is in its second state, indicating that potential Vout is greater than potential Vref.

At time t1, potential Vout becomes smaller than potential Vref (FIG. 2) and, although this is not shown herein, this causes the switching of signal START to its first state.

As a response to the switching of signal START, at time t2, the circuit controls the switching to the on state of transistor 9, and the beginning of a ramp RP via signal cmdP.

Time t2 marks the beginning of time period Ton.

From time t2, potential RP increases to become equal to potential Vref at time t3.

Thus, although this is not illustrated herein, signal COMP switches from its first state to its second state at time t3. As a response to the switching of signal COMP, circuit 300 controls the switching to the off state of transistor 9, the switching to the on state of transistor 13, and the beginning of a potential ramp RN via control signal cmdN. In this example, at time t3, circuit 300 also controls the end of potential ramp RP via signal cmdP, potential RP then switching back to potential GND.

Time t3 marks the end of time period Ton and the beginning of time period Toff.

From time t3, potential RN decreases to become equal to potential Vref at time t4.

Thus, at time t4, signal COMP switches from its second state to its first state. As a response to the switching of signal COMP, circuit 300 controls the switching to the off state of transistor 13. At time t4, in the present example, circuit 300 also control the end of potential ramp RN via signal cmdN, potential RN then switching back to potential Vbat.

Time t4 marks the end of time period Toff.

Although the case where potential ramps RP and RN are compared with potential Vref has been described here-above in relation with FIGS. 3 and 4, it will be within the abilities of those skilled in the art to adapt the description to the case where potential ramps RN and RP are compared with potential Vout, be the comparisons implemented by means of a single comparator 306 and of a selection circuit 308, or by using two different comparators.

Further, the practical implementation of state machine 300 is within the abilities of those skilled in the art based on the functional indications given here-above.

It will also be within the abilities of those skilled in the art to determine the slope of potential ramp RN, for example, according to time period Ton, so that the end of time period Toff corresponds to the time when current IL through inductance 15 becomes zero. In particular, according to an embodiment, it may be provided for the slope of ramp RN to be, like that of potential ramp RP, proportional to the difference between potentials Vbat and Vout.

Figure 5:
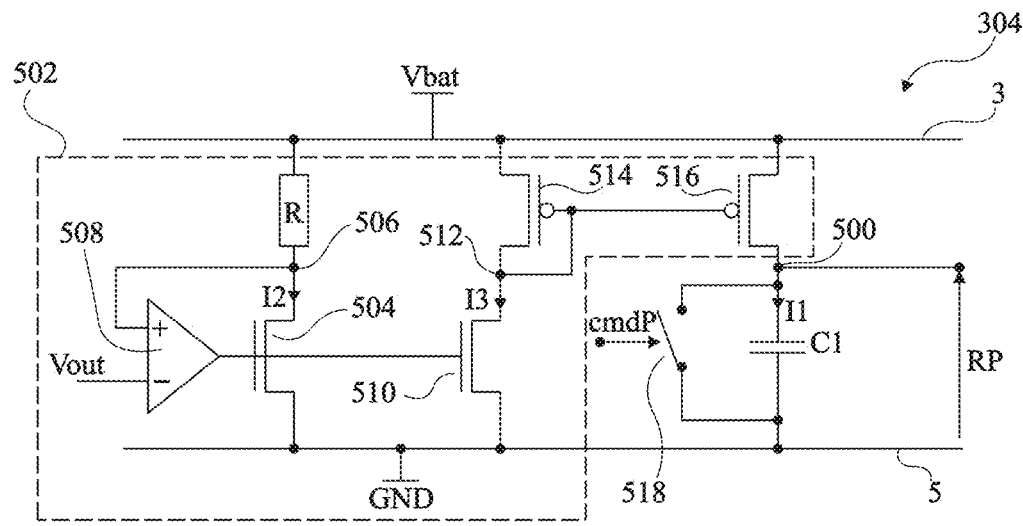
FIG. 5 shows, in the form of a circuit, an embodiment of a portion of the converter of FIG. 3.

FIG. 5 shows, in the form of a circuit, an embodiment of a portion of the converter of FIG. 3. More particularly, FIG. 5 shows an embodiment of ramp generator 304.

Ramp generator 304 comprises a capacitor C1 connected between rail 5 and a (third) node 500 configured to deliver potential ramp RP.

Ramp generator 304 further comprises a current source 502 delimited by a frame in dotted lines in FIG. 5. A first terminal of current source 502 is connected to rail 3, a second terminal of current source 502 being connected to node 500. Current source 502 is configured to deliver a current I1 having a value proportional to the difference between potentials Vbat and Vout.

Current source 502 comprises a (third) MOS transistor 504, preferably an NMOS transistor, connected between rail 5 and a (fourth) node 506. In other words, a conduction terminal of transistor 504, for example, its source, is connected to rail 5, the other conduction terminal of transistor 504, for example, its drain, being connected to node 506.

Current source 502 further comprises a resistor R connected between rail 3 and node 506.

Current source 502 also comprises an operational amplifier 508 having an input, that is, its inverting input (−), configured to receive potential Vout, having another input, that is, its non-inverting input (+), connected to node 506, and having an output connected to a control terminal of transistor 504.

Transistor 504 is then controlled by the amplifier so that node 506 is at potential Vout. Thus, a current I2 flowing through transistor 504 is defined by the following relation (7):

$$I2=(Vbat-Vout)/R,$$

Current source 502 comprises a (fourth) MOS transistor 510, preferably an NMOS transistor, connected between rail 5 and a (fifth) node 512. In other words, a conduction terminal of transistor 510, for example, its source, is connected to rail 5, the other conduction terminal of transistor 510, for example, its drain, being connected to node 512.

The control terminal of transistor 510 is connected to the control terminal of transistor 504, and thus to the output of operational amplifier 508. Thus, a current I3 proportional to current I2, preferably equal to current I2, flows through transistor 510.

Current source 502 comprises a (fifth) MOS transistor 514, preferably a PMOS transistor, connected between rail 3 and node 512. In other words, a conduction terminal of transistor 514, for example, its source, is connected to rail 3, the other conduction terminal of transistor 514, for example, its drain, being connected to node 512.

Current source 502 comprises a (sixth) MOS transistor 516, preferably a PMOS transistor, mirror-assembled with transistor 514 and connected between rail 3 and node 500. In other words, a conduction terminal of transistor 516, for example, its source, is connected to rail 3, the other conduction terminal of transistor 516, for example, its drain, is connected to node 500, and the control terminal of transistor 516 is connected to the control terminal of transistor 514, the drain and the gate of transistor 514 being connected to each other. The conduction terminal of transistor 516 which is connected to node 500 corresponds to the second terminal of current source 502.

Thus, current I1 crossing transistor 516 is proportional, preferably equal, to the current I3 flowing through transistor 514, and thus proportional, preferably equal, to current I2. Current source 502 thus effectively delivers a current I1 proportional to the difference between potentials Vbat and Vout.

As an example, in the case where transistors 504, 510, 514, and 516 are sized so that currents I1, I2, and I3 are equal, source 502 delivers a current I1 defined by the following relation (8):

$$I1=(V\text{bat}-V\text{out})/R.$$

Ramp generator 304 comprises a circuit 518, here a switch, controlled by signal cmdP (FIG. 3) and configured to start or stop a potential ramp RP according to the state of signal cmdP.

More particularly, in the embodiment shown in FIG. 5, switch 518, for example implemented by a MOS transistor, preferably an NMOS transistor, is connected in parallel with capacitor C1, that is, between node 500 and rail 5.

When signal cmdP is in a first state, for example, a high state, switch 518 is turned on and potential RP is equal to reference potential GND.

When signal cmdP switches from its first state to its second state, for example, the low state, switch 518 turns off. Capacitor C1 charges via current I1 and potential RP increases with time t according to the following relation (9):

$$RP=(t*I1)/C1,$$

I1 being proportional to the difference between potentials Vbat and Vout, or, in other words, to Vbat−Vout.

Thus, the slope of potential ramp RP is effectively proportional to difference Vbat−Vout.

As an example, in the case where transistors 504, 510, 514, and 516 are sized so that currents I1, I2, and I3 are equal, current I1 verifies above relation (8) and potential ramp RP thus verifies the following relation (10):

$$RP=(t*(V\text{bat}-V\text{out}))/(R*C1),$$

whereby time period Ton is defined by the following relation (11):

$$T\text{on}=(V\text{ref}*(R*C)/(V\text{bat}-V\text{out})),$$

when ramp RP is compared with potential Vref to define time period Ton.

Figure 6:
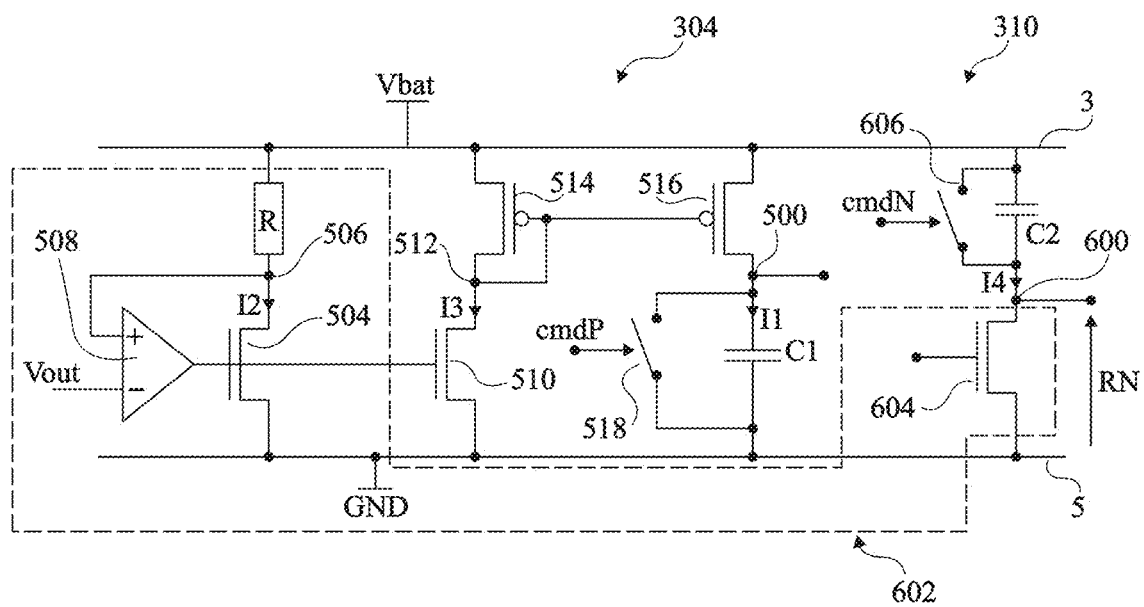
FIG. 6 shows, in the form of a circuit, an alternative embodiment of a portion of the converter of FIG. 3.

FIG. 6 shows, in the form of a circuit, an alternative embodiment of a portion of the converter of FIG. 3. More particularly, in this variation, the slope of potential ramp RN is proportional to the difference between potentials Vbat and Vout, FIG. 6 showing ramp generators 304 and 310.

The ramp generator 304 of FIG. 6 is identical to that of FIG. 5.

Ramp generator 310 comprises a capacitor C2 connected between rail 3 and a (sixth) node 600 configured to deliver potential ramp RN.

Ramp generator 310 further comprises a current source 602 delimited by a frame in dotted lines in FIG. 6. A first terminal of current source 602 is connected to rail 5, a second terminal of current source 600 being connected to node 600. Current source 602 is configured to deliver a current I4 having a value proportional to the difference between potentials Vbat and Vout.

Current source 602 comprises elements in common with current source 502 (FIG. 5) of ramp generator 304, that is, amplifier 508, resistor R, and transistor 504. Indeed, advantage is taken from the current I2 generated by means of amplifier 508, of resistor R, and of transistor 504 to generate current I4.

Current source 602 further comprises a (sixth) MOS transistor 604, preferably, an NMOS transistor, connected between rail 5 and node 600. In other words, a conduction terminal of transistor 604, for example, its source, is connected to rail 5, the other conduction terminal of transistor 604, for example, its drain, being connected to node 600 and corresponding to the second terminal of current source 602.

The control terminal of transistor 604 is connected to the control terminal of transistor 504, and thus to the output of operational amplifier 508, although this connection is not shown in FIG. 6 to avoid overloading the drawing.

Thus, the current I4 flowing through transistor 604 is proportional, preferably equal, to current I2. Current I4 is thus effectively proportional to the difference between potentials Vbat and Vout.

Ramp generator 310 comprises a circuit 606, here a switch, controlled by signal cmdN (FIG. 3) and configured to start or stop a potential ramp RN according to the state of signal cmdN.

More particularly, in the embodiment shown in FIG. 6, switch 606, for example, implemented by a MOS transistor, preferably a PMOS transistor, is connected in parallel with capacitor C2, that is, between rail 3 and node 600.

When signal cmdN is in a first state, for example, the low state, switch 606 is turned on and potential RN is equal to potential Vbat.

When signal cmdN switches from its first state to its second state, for example, the high state, switch 606 turns off. Capacitor C2 charges via current I4 and potential RN decreases over time t according to the following relation (12):

$$RN=V\text{bat}-(t*I4)/C2,$$

I4 being proportional with the difference between potentials Vbat and Vout.

Thus, the slope of potential ramp RN is, like that of potential ramp RP, proportional to the difference between potentials Vbat and Vout.

As an example, in the case where transistors 504 and 604 are sized so that currents I2 and I4 are equal, potential ramp RN verifies the following relation (13):

$$RN=V\text{bat}-(t*(V\text{bat}-V\text{out}))/(R*C2),$$

whereby time period Toff is defined by the following relation (14):

$$T\text{off}=((V\text{bat}-V\text{ref})*(R*C2)/(V\text{bat}-V\text{out})),$$

when ramp RN is compared with potential Vref to define time period Toff.

In practice, potential Vout may be considered as equal to its set point value, that is, potential Vref in the present example. Thus, time period Toff may be considered as equal to the product of resistance R by capacitance C2.

Although the circuit of FIG. 6 has been described as corresponding to a ramp generator 304 configured to deliver ramp RP and to a ramp generator 310 configured to deliver ramp RN, this circuit may also be seen as a single ramp generator comprising two outputs 500 and 600 configured to deliver the potential ramps, respectively RP and RN, the single generator being then controlled by the two signals cmdP and cmdN.

Further, an embodiment of ramp generator 310 has been described in relation with FIG. 3 and FIG. 5 in the case where each ramp RN is decreasing from potential Vbat, in other embodiments, each ramp RN is increasing from the reference potential.

In embodiments where each ramp RN is increasing from the reference potential, as long as signal sel (FIG. 3) is maintained in its second state, signal COMP is in its first state, for example, the low state, as long as potential RN is smaller than potential Vref, and switches to its second state, for example, the high state, as long as potential RN becomes greater than potential Vref. The switching of signal COMP from its first state to its second state marks the end of time period Toff and circuit 300 then controls the setting to the off state of transistor 13. Preferably, circuit 300 simultaneously controls the end of potential ramp RN via signal cmdN. The above operation also applies to the case where potential RN is compared with potential Vout rather than with potential Vref to define time period Toff.

Figure 7:
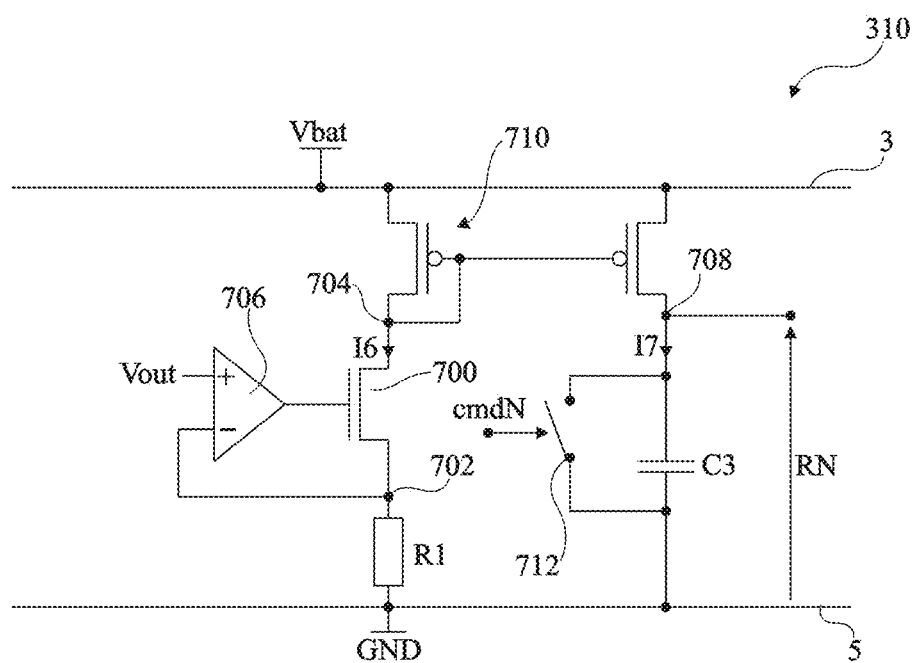
FIG. 7 illustrates, in the form of a circuit, another alternative embodiment of a portion of the converter of FIG. 3.

FIG. 7 shows, in the form of a circuit, another alternative embodiment of a portion of the converter of FIG. 3. More particularly, in this variation, each ramp RN is increasing from reference potential GND, and time period Toff corresponds to the time taken by each ramp RN to reach potential Vref or Vout.

Ramp generator RN is a MOS transistor 700, preferably an NMOS transistor. A conduction terminal of transistor 700, for example, its source, is connected to a node 702, coupled to rail 5 via a resistor R1, the other conduction terminal of transistor 700, for example, its drain, being connected to a node 704 coupled to rail 3.

Ramp generator RN further comprises an operational amplifier 706 having an input, that is, its non-inverting input (+), configured to receive potential Vout, having another input, that is, its inverting input (−), connected to node 702, and having an output connected to a control terminal of transistor 700.

Transistor 700 is then controlled by amplifier 706 so that node 702 is at potential Vout. Thus, the current I6 flowing through transistor 706 is defined by the following relation (15).

$$I6=Vout/R1.$$

Ramp generator RN further comprises a capacitor C3 connected between rail 5 and an output node 708 of the ramp generator. Ramps RN are available on node 708.

A current mirror 710 of the ramp generator enables to deliver to node 708 a current I7 proportional, preferably equal, to current I6. More particularly, current mirror 710 comprises a first branch coupling node 704 to rail 3, and a second branch coupling node 708 to rail 3. Each branch of current mirror 710 comprises a MOS transistor, preferably a PMOS transistor.

Ramp generator RN comprises a circuit 712, here a switch, controlled by signal cmdN (FIG. 3) and configured to start or stop a potential ramp RN according to the state of signal cmdN.

More particularly, in the embodiment shown in FIG. 7, switch 712, for example implemented by a MOS transistor, preferably an NMOS transistor, is connected in parallel with capacitor C3, that is, between node 708 and rail 5.

When signal cmdN is in a first state, for example, a high state, switch 712 is turned on, and potential RN is equal to reference potential GND.

When signal cmdN switches from its first state to its second state, for example, the low state, switch 712 turns off. Capacitor C3 charges via current I7, and potential RN increases over time t according to the following relation (16):

$$RN=(t*I7)/C3$$

Thus, when ramp RN is compared with potential Vref to define time period Toff, time period Toff is defined by the following relation (17):

$$Toff=Vref*C3/I7$$

As an example, when current I7 is equal to current I6, and ramp RN is compared with potential Vref to define time period Toff, time period Toff is defined by the following relation (18):

$$Toff=Vref*C3*R1/Vout$$

In practice, potential Vout may be considered as equal to its set point value, that is, potential Vref in the present example. Thus, in the example where currents I6 and I7 are equal, time period Toff may be considered as equal to the product of resistance R1 by capacitance C3. It will be within the abilities of those skilled in the art to determine the values of resistance R1 and of capacitance C3 so that, at the end of time period Toff, the current IL in inductance 15 (FIGS. 1 and 3) is zero.

Various embodiments and variations have been described. It will be understood by those skilled in the art that certain features of these various embodiments and variations may be combined, and other variations will occur to those skilled in the art. In particular, a converter 1 where time period Ton is proportional to the inverse of potential difference Vbat−Vout may be implemented otherwise than with a ramp generator 304 such as described in relation with FIGS. 3 to 6. Further, it will be within the abilities of those skilled in the art to adapt the above description to the case where, for at least described signals, the high and low states of this signal are inverted.

Finally, the practical implementation of the described embodiments and variations is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A voltage converter comprising:
  a first transistor coupled between a first rail configured to receive a supply voltage and a first node;
  a second transistor coupled between the first node and a second rail coupled to a reference voltage;
  an inductance coupled between the first node and a second node configured to deliver an output voltage;
  a first ramp generator configured to deliver a first voltage ramp with a slope proportional to a first voltage difference between the supply voltage and the output voltage; and
  a second ramp generator configured to deliver a second voltage ramp with a slope proportional to the first voltage difference,
  wherein, at each operating cycle of the voltage converter:
    the first transistor is maintained in the on state for a first time period, the first time period being determined from a comparison of the first voltage ramp and the output voltage or a voltage set point, and
    the second transistor is maintained in the on state for a second time period, the second time period being determined from a comparison of the second voltage ramp and the output voltage or the voltage set point.

2. The voltage converter of claim 1, wherein the reference voltage is ground.

3. The voltage converter of claim 1, further comprising a control circuit configured to control, at each operating cycle of the voltage converter, successively:
a setting to the on state of the first transistor;
a setting to the off state of the first transistor and a setting to the on state of the second transistor; and
a setting to the off state of the second transistor, the control circuit being configured, at each operating cycle, to maintain the first transistor in the on state for the first time period.

4. The voltage converter of claim 3, wherein the control circuit comprises a state machine.

5. The voltage converter of claim 3, wherein the control circuit is configured, at each operating cycle of the voltage converter, to maintain the second transistor in the on state for the second time period.

6. The voltage converter of claim 3, wherein the control circuit is further configured to start an operating cycle when the output voltage is smaller than the voltage set point.

7. The voltage converter of claim 6, wherein the first time period is proportional to an inverse of a difference between the supply voltage and the output voltage.

8. The voltage converter of claim 3, wherein the control circuit further comprises a comparator configured to compare the first voltage ramp with the output voltage or the voltage set point.

9. The voltage converter of claim 3, wherein the first ramp generator comprises:
a capacitor coupled between the second rail and a third node configured to deliver the first voltage ramp; and
a current source having a first terminal coupled to the first rail and a second terminal coupled to the third node, the current source being configured to deliver a current having a value proportional to the first voltage difference.

10. The voltage converter of claim 9, wherein the current source comprises:
a third transistor coupled between the second rail and a fourth node;
a resistor coupled between the first rail and the fourth node;
a fourth transistor coupled between the second rail and a fifth node;
a fifth transistor coupled between the first rail and the fifth node;
a sixth transistor mirror-assembled with the fifth transistor and coupled between the first rail and the second terminal of the current source; and
an operational amplifier having a first input configured to receive the output voltage, a second input coupled to the fourth node, and an output coupled to a control terminal of the third transistor and to a control terminal of the fourth transistor.

11. The voltage converter of claim 10, wherein the first, second, third, fourth, fifth, and sixth transistors are metal-oxide semiconductor (MOS) transistors.

12. The voltage converter of claim 10, wherein the first input of the operational amplifier is an inverting input and the second input of the operational amplifier is a non-inverting input.

13. The voltage converter of claim 9, wherein the first ramp generator further comprises a switch coupled in parallel with the capacitor.

14. The voltage converter of claim 13, wherein the control circuit is further configured to control the turning off of the switch at each beginning of an operating cycle of the voltage converter.

15. The voltage converter of claim 1, wherein the second voltage ramp is configured to decrease from the supply voltage, the second time period corresponding to a time taken by the second voltage ramp to decrease from the supply voltage to the output voltage or to the voltage set point.

16. The voltage converter of claim 1, wherein the first voltage ramp is configured to increase from the reference voltage, the first time period corresponding to a time taken by the first voltage ramp to increase from the reference voltage to the output voltage or to the voltage set point.

17. A method of operating a voltage converter, the method comprising:
receiving a supply voltage at a first rail;
receiving a reference voltage at a second rail;
delivering a regulated output voltage at a first node;
delivering, at an output of a first ramp generator, a first voltage ramp with a slope proportional to a first voltage difference between the supply voltage and the regulated output voltage;
delivering, at an output of a second ramp generator, a second voltage ramp with a slope proportional to the first voltage difference;
at each operating cycle of the voltage converter, successively:
setting to the on state a first transistor that is coupled between the first rail and a second node that is coupled to the first node via an inductance;
setting to the off state the first transistor and the on state a second transistor that is coupled between the second node and the second rail; and
setting to the off state the second transistor, wherein, at each operating cycle of the voltage converter:
the first transistor is maintained in the on state for a first time period, the first time period being determined from a comparison of the first voltage ramp and the regulated output voltage or a voltage set point, and
the second transistor is maintained in the on state for a second time period, the second time period being determined from a comparison of the second voltage ramp and the regulated output voltage or the voltage set point.

18. The method of claim 17, wherein the first time period is proportional to an inverse of a difference between the supply voltage and the regulated output voltage.

19. A circuit comprising:
a first supply terminal configured to receive a supply voltage;
a second supply terminal configured to receive a reference voltage;
a first transistor coupled between the first supply terminal and a first node;
a second transistor coupled between the first node and the second supply terminal;
a third terminal configured to be coupled to the first node via an inductor;
a first ramp generator configured to deliver a first voltage ramp with a slope proportional to a first voltage difference between the supply voltage and an output voltage; and a second ramp generator configured to deliver a second voltage ramp with a slope proportional to the first voltage difference; and a control circuit configured to, at each operating cycle, successively:

set to the on state the first transistor, set to the off state the first transistor and to the on state the second transistor, and set to the off state the second transistor, wherein, at each operating cycle:

the first transistor is maintained in the on state for a first time period, the first time period being determined from a comparison of the first voltage ramp and the output voltage or a voltage set point, and the second transistor is maintained in the on state for a second time period, the second time period being determined from a comparison of the second voltage ramp and the output voltage or the voltage set point.

20. The circuit of claim 19, wherein the control circuit comprises:

a state machine having a first output coupled to a control terminal of the first transistor, a second output coupled to a control terminal of the second transistor, a first input coupled to the third terminal;

and a selection circuit having a first input coupled to an output of the first ramp generator, a second input coupled to the second ramp generator, and an output coupled to a second input of the state machine.

21. The circuit of claim 20, wherein the first ramp generator comprises an input coupled to a third output of the state machine, and wherein the second ramp generator comprises an input coupled to a fourth output of the state machine.

22. The circuit of claim 19, wherein the first time period is proportional to an inverse of a difference between the supply voltage and the output voltage.

* * * * *